(12) United States Patent
Zhou et al.

(10) Patent No.: US 12,157,982 B2
(45) Date of Patent: Dec. 3, 2024

(54) FISH-PASSING SYSTEM AND A FISH-PASSING METHOD WITH TOURIST ORNAMENTAL FUNCTION

(71) Applicant: POWERCHINA GUIYANG ENGINEERING CORPORATION LIMITED, Guizhou (CN)

(72) Inventors: Jiafei Zhou, Guizhou (CN); Tengfei Tang, Guizhou (CN); Fan Chen, Guizhou (CN); Zaixing Zhao, Guizhou (CN); Xiao Zong, Guizhou (CN); Yi Zhao, Guizhou (CN); Lang Wei, Guizhou (CN); Hao Xia, Guizhou (CN); Hongxin Cai, Guizhou (CN)

(73) Assignee: POWERCHINA GUIYANG ENGINEERING CORPORATION LIMITED, Guiyang (CN)

( * ) Notice: Subject to any disclaimer, the term of this patent is extended or adjusted under 35 U.S.C. 154(b) by 0 days.

(21) Appl. No.: 18/560,627

(22) PCT Filed: Apr. 14, 2023

(86) PCT No.: PCT/CN2023/088362
§ 371 (c)(1),
(2) Date: Nov. 13, 2023

(87) PCT Pub. No.: WO2023/213180
PCT Pub. Date: Nov. 9, 2023

(65) Prior Publication Data
US 2024/0254710 A1    Aug. 1, 2024

(30) Foreign Application Priority Data

May 6, 2022    (CN) .......................... 202210487766.1

(51) Int. Cl.
*E02B 8/08*    (2006.01)

(52) U.S. Cl.
CPC .................................... *E02B 8/085* (2013.01)

(58) Field of Classification Search
CPC ............ E02B 8/085; E02B 8/08; Y02A 40/60
See application file for complete search history.

(56) References Cited

U.S. PATENT DOCUMENTS 6,394,699 B1 *  5/2002  Neufeld ................... E02B 8/085
                                                       405/83

FOREIGN PATENT DOCUMENTS

| CN | 105454171 A | 4/2016 |
|---|---|---|
| CN | 107905186 A | 4/2018 |

(Continued)

OTHER PUBLICATIONS

International Search Report of PCT/CN2023/088362.

*Primary Examiner* — Sean D Andrish

(57) ABSTRACT

This disclosure discloses a fish-passing system and a fish-passing method with tourist ornamental function, belonging to the technical field of water conservancy and hydropower ecological protection. The system comprises a dam, a Ferris wheel, a water supplement component, and a central controller (9). The upstream of the dam is equipped with a fish-release chute, and one end of the fish-release chute extends into the water body of the dam reservoir. The downstream of the dam is equipped with a fish passage transfer mechanism, and the fish passage transfer mechanism is connected to the downstream water body of the dam through a fish passage. The Ferris wheel is located between the fish passage transfer mechanism and the fish-release chute, and a number of human-ascending mechanisms (8) are evenly arranged on the Ferris wheel.

11 Claims, 5 Drawing Sheets

(56) References Cited

FOREIGN PATENT DOCUMENTS

| | | | |
|---|---|---|---|
| CN | 109736254 A | | 5/2019 |
| CN | 111206556 A | | 5/2020 |
| CN | 111350170 A | | 6/2020 |
| CN | 112640832 A | | 4/2021 |
| CN | 213978883 U | | 8/2021 |
| CN | 114673124 A | | 6/2022 |
| JP | 09256349 A | | 9/1997 |
| KR | 2010130107 | * | 12/2010 |
| KR | 20140099112 A | | 8/2014 |
| WO | WO 2011/099845 | * | 8/2011 |

* cited by examiner

FISH-PASSING SYSTEM AND A FISH-PASSING METHOD WITH TOURIST ORNAMENTAL FUNCTION

CROSS-REFERENCE TO RELATED APPLICATIONS

This Application is a national stage application of PCT/CN2023/088362. This application claims priorities from PCT Application No. PCT/CN2023/088362, filed Apr. 14, 2023, and from the Chinese patent application 202210487766.1 filed May 6, 2022, the content of which are incorporated herein in the entirety by reference.

TECHNICAL FIELD

The present disclosure relates to a fish-passing system and a fish-passing method with tourist ornamental function, belonging to the technical field of water conservancy and hydropower ecological protection.

BACKGROUND

Currently, in order to mitigate the impact of dam barriers on migratory fish and promote gene exchange between fish populations upstream and downstream of dam sites, fish passage is achieved through methods such as fishways, simulated natural channels, fish lifts, fish transport facilities, and fish locks. According to technical specifications and practical experience, fish passage are facilities suitable for high-head water resources and hydropower projects mainly include fishways, fish lifts, and fish transport systems, or different combinations thereof. Due to factors such as site topography, geology, and layout conditions, designing a fishway alone to achieve fish passage is relatively challenging. It often requires a lengthy fishway to achieve energy dissipation, resulting in poor fish passage efficiency and high economic costs. For instance, in the ecological dam with integrated fishways provided in patent document CN202210089204.1, numerous chamber rooms were constructed for energy dissipation. Fish lifts and fish transport systems are less utilized in China, their operation processes are complex, and their fish passage effects have not been widely recognized. Therefore, it is necessary to explore a fish passage system that can improve fish passage efficiency in water resource projects and reduce construction and operation costs.

SUMMARY

The present disclosure provides a fish-passing system and a fish-passing method with tourist ornamental function.

The present disclosure is achieved through the following technical solutions:

A fish-passing system with tourist ornamental function, comprising a dam structure, a Ferris wheel, a water supplementation component, and a central controller. The dam structure is equipped with an upstream discharge slide, with one end of the discharge slide extending into the water body of the dam reservoir. The dam structure's downstream features a fish transit mechanism, connected to the water body downstream of the dam through a fishway. The Ferris wheel is located between the fish transfer mechanism and the discharge slide, with multiple fish-carrying and human-ascending mechanisms evenly distributed on the Ferris wheel. One end of the water supplementation component extends into the water body of the dam reservoir, and the other end is connected to the fish transfer mechanism. The central controller is connected to the Ferris wheel, fish transfer mechanism, and human-ascending mechanisms.

The fishway is designed as a vertical slot fishway, with one end near the fish transfer mechanism inclined upward.

The fish transfer mechanism comprises a water collection downward slope section and transport fish tank A. One end of the water collection downward slope section connects to the fishway through a water collection horizontal section, while the other end is inclined downward. Transport fish tank A is positioned at the far end of the water collection downward slope section away from the fishway, and its elevation is lower than that of the water collection downward slope section.

Transport fish tank A comprises a box body, a sliding sleeve, and gate A. The bottom of the box body is equipped with multiple parallel support legs. The upper side of the box body opens on the side away from the water collection downward slope section.

The sliding sleeve is located on the upper inner side of the box body, and its two ends slide on the inner wall of the box body through sliding plates. The sliding sleeve is connected to the box body through multiple parallel hydraulic rods, and gate A is positioned on the inner side of the sliding sleeve. Gate A is connected to the top of the sliding sleeve through actuator A, which is electrically connected to the central controller.

The sliding plates are equipped with multiple parallel cylindrical shafts, each of which has movable rollers. The inner wall of the box body features horizontal sliding grooves corresponding to the cylindrical shafts, and the rollers are positioned within these grooves.

The human-ascending fish mechanisms comprises a touring passenger cabin and a transfer chute. The touring passenger cabin is equipped with fish transportation components A on the side near the fish transfer mechanism and fish transportation components B on the side near the discharge slide. One end of the transfer chute is connected to the lower part of fish transportation component A, while the other end is inclined downward and connected to the lower part of fish transportation component B. Fish transportation component A comprises transport fish tank B and sub-controller A. The upper side of transport fish tank B features an opening, and a slot A is established on transport fish tank B at a position corresponding to the transfer chute. Vertical sliding grooves A are machined on transport fish tank B, connecting to slot A, and gate B slides within the vertical sliding groove A. Gate B is connected to the top of transport fish tank B through electric cylinder B. Sub-controller A is electrically connected to electric cylinder B and wirelessly connected to the central controller.

Fish transportation component B comprises transport fish tank C and sub-controller B. The upper side of transport fish tank C features an opening, and a slot B is established on transport fish tank C at a position corresponding to the transfer chute. At the lower part of the side of transport fish tank C opposite the touring passenger cabin, a discharge outlet is established, and a vertical sliding groove B is established on transport fish tank C, connecting to the discharge outlet. Gate C slides within the vertical sliding groove B and is connected to the top of transport fish tank C through electric cylinder C. Sub-controller B is electrically connected to electric cylinder C and wirelessly connected to the central controller.

The water supplementation component comprises a water supply tank. The water supply tank is positioned at a height 0.5 m~1 m above the top surface of the fish transfer mechanism. The water supply tank is connected to the dam structure through water supply pipe A, with one end extending into the water body of the dam structure and connected to an electric ball valve A. The water supply pipe A is arranged in a winding manner, and the water supply tank is connected to the fish transfer mechanism through water supply pipe B. electric ball valve A and electric ball valve B are both electrically connected to the central controller.

A method of fish-passing system with tourist ornamental function, comprising the following main steps:

A. Fish ascend through the fishway to the water collection horizontal section and then slide down the water collection downward slope section into transport fish tank A.

B. The Ferris wheel performs intermittent equidistant rotational movement. When one of the fish-carrying and human-ascending mechanism aligns with transport fish tank A, another human-ascending fish mechanisms aligns with the discharge slide.

C. At the instant when the Ferris wheel switches from a rotating state to a paused state, transport fish tank A is activated to release the fish population inside it into the fish transportation component A of the human-ascending fish mechanisms positioned directly opposite. Simultaneously, the fish transportation component B within the human-ascending fish mechanisms aligned with the discharge slide is activated to release the fish population onto the discharge slide. Subsequently, the fish population slides down the discharge slide into the water body of the dam reservoir.

D. The Ferris wheel resumes rotation, and prior to the next impending pause, the fish transportation component A that has just received the fish population in step C is activated. This allows the fish population to enter the fish transportation component B within the same fish-carrying and human-ascending mechanism. Meanwhile, the fish transportation component B that had released the fish population in step C closes the discharge outlet. As the Ferris wheel continues to rotate by one-third of the equidistant angle, both the gate A of the transport fish tank A and the gate B of the transport fish tank A close.

E. Repeat steps C and D to gradually raise the fish population from the downstream water body of the dam structure to the water body of the dam reservoir.

Effect of the Disclosure

1. It constructs a new type of fish passage facility for high dams and large reservoirs. By combining the Ferris wheel with the upstream fish passage requirements, the fish population in the downstream water body of the dam is gradually raised to the water body of the dam reservoir through the intermittent equidistant rotational movement of the Ferris wheel, resulting in effective fish passage. This system is particularly suitable for promoting gene exchange among fish populations upstream and downstream of high-head dams. Moreover, the fishway in this system is relatively short, mainly used to collect fish into the water collection horizontal section. This overcomes the limitation of traditional fishways with long pool bodies for upstream passage, significantly reducing engineering investments.

2. It introduces an enjoyable amusement mode for water conservancy and hydropower projects. Passengers inside the touring passenger cabin can not only appreciate the magnificent water resources landscape around the dam but also observe the fish passage process of the integrated fish passage system, including collection, transport, raising, and release. This system is highly valuable for observation, contributing significantly to improving the quality of water conservancy and hydropower scenic areas and enhancing social benefits through science communication.

3. It enhances the safety of water supplementation system for fish passage facilities. To prevent high flow rates from negatively impacting the fish transfer mechanism, the water supplementation component is designed as a two-stage supplementation system. The first stage comprises the winding water supply pipe A combined with the water supply tank, and the second stage includes the water supply tank combined with water supply pipe B. This ensures that water is supplied to the water collection horizontal section, providing suitable flow rate and flow conditions for fish passage and transport, while reducing potential damage to fish and the fish transfer mechanism during transport and raising.

REFERENCE SIGNS

Figure 1:
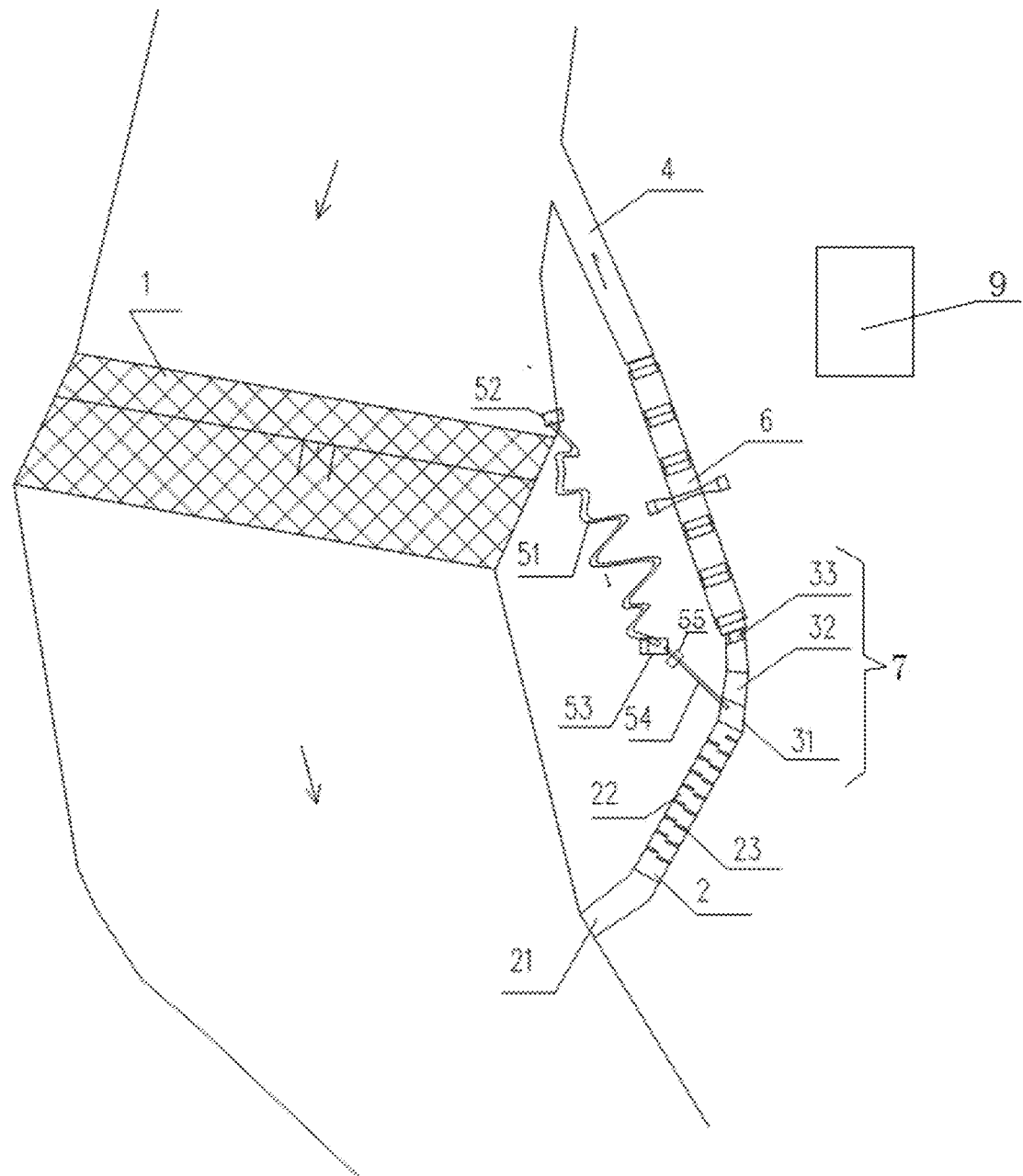
FIG. 1: Schematic diagram of the structure of the present disclosure.

1—Dam body, 2—Fishway, 21—Inlet, 22—Pool chamber, 23—Partition, 31—Water collection horizontal section, 32—Water collection downhill section, 33—Fish transport box A, 331—Support leg, 332—Gate A, 333—Slide board, 334—Box body, 335—Slide sleeve, 336—Electric cylinder A, 337—Hydraulic rods 34—Fish transport box B, 341—Gate B, 342—Electric cylinder B, 343—slot A, 344—Vertical sliding grooves A, 35—Fish transport box C, 351—Gate C, 352—Electric cylinder C, 353—slot B, 354 Discharge outlet, 355 Vertical sliding grooves B, 36—Transport slide, Sub-controller 37, Sub-controller 38, 4—Fish release slide, 5—Water supplementation component, 51—Water supply pipe A, 52—Electric ball valve A, 53—Water supply tank, 54—Water supply pipe B, 55—Electric Ball Valve B, 6—Ferris wheel, 61—Touring passenger cabin, 62—fish transportation components A, 63—fish transportation components B, 7—fish transfer mechanism, 8—Human-ascending fish mechanisms, 9—central controller.

DETAILED DESCRIPTION

Further description of the technical solution of the present disclosure is provided below. The protected scope is not limited to the description below.

As shown in FIGS. 1 to 5, the present disclosure provides a fish-passing system with tourist ornamental function, including the dam body 1, Ferris wheel 6, water supplementation component 5, and central controller 9. The upstream of the dam body 1 is equipped with the fish release slide 4, and one end of the fish release slide 4 extends into the reservoir water body of the dam body 1. The downstream of the dam body 1 is equipped with the fish transit mechanism, and the fish transfer mechanism 7 is connected to the water body downstream of the dam body 1 through the fishway 2. The Ferris wheel 6 is located between the fish transfer mechanism 7 and the fish release slide 4, and multiple human-ascending fish mechanisms 8 are evenly distributed on the Ferris wheel 6. One end of the water supplementation component 5 extends into the reservoir water body of the dam body 1, and the other end is connected to the fish transfer mechanism 7. The central controller 9 is connected to the Ferris wheel 6, fish transfer mechanism 7, and human-ascending fish mechanisms 8.

The fishway 2 is a vertical slot fishway, and the end of the fishway 2 near the fish transfer mechanism 7 is inclined upwards. As shown in FIG. 1, the fishway 2 includes an inlet 21, pool chamber 22, and partition 23. The inlet 21 is used to attract fish groups with upstream migration needs into the fishway 2 and further upstream inside the fishway 2 under suitable hydraulic conditions. The vertical slot short fishway pool body as a whole is shorter than traditional vertical slot fishways, providing a short distance for fish to migrate upstream and avoiding significant energy consumption during upstream migration in traditional long fishways. The inclined arrangement of the fishway 2 is connected to one end of the water collection horizontal section 31. When the fish migrate to the water collection horizontal section 31, their elevation is higher than that of the fish transport box A 33, facilitating the fish to slide down to the fish transport box A 33 along the water collection downhill section 32.

The fish transfer mechanism 7 includes the water collection downhill section 32 and the fish transport box A 33. One end of the water collection downhill section 32 is connected to the fishway 2 through the water collection horizontal section 31, and the other end is inclined downwards. The fish transport box A 33 is located at the end of the water collection downhill section 32, away from the fishway 2, and the elevation of the fish transport box A 33 is lower than that of the water collection downhill section 32.

The fish transport box A 33 includes the box body 334, slide sleeve 335, and gate A 332. Multiple support legs 331 are installed side by side on the bottom of the box body 334. The upper side and the side far from the water collection downhill section 32 of the box body 334 are open. The slide sleeve 335 is located on the inner upper part of the box body 334. The two ends of the slide sleeve 335 are slidably connected to the inner wall of the box body 334 through slide boards 333, and the slide sleeve 335 is connected to the box body 334 through multiple parallel hydraulic rods 337. Gate A 332 is located on the inner side of the slide sleeve 335 and is slidably connected to the slide sleeve 335. Gate A 332 is connected to the top of the slide sleeve 335 through electric cylinder A 336, and electric cylinder A 336 is electrically connected to the central controller 9. In use, electric cylinder A 336 is installed at the top of the slide sleeve 335. By raising or lowering electric cylinder A 336, gate A 332 is opened or closed to release fish through the passage below the slide sleeve 335. During the rotation of the Ferris wheel 6, when a fish transport box B 34 contacts the slide sleeve 335, the fish transport box B 34 pushes the slide sleeve 335 in the direction closer to the water collection downhill section 32, overcoming the resistance of the hydraulic rods 337. When the fish transport box B 34 separates from the slide sleeve 335, the slide sleeve 335 moves back to its initial position under the action of the hydraulic rods 337, avoiding interference between fish transport box B 34 and fish transport box A 33.

Multiple round axles are installed side by side on the slide board 333, and each round axle is equipped with movable rollers. Horizontal slide grooves are processed on the inner wall of the box body 334 at positions corresponding to the round axles, and the rollers are located in the horizontal slide grooves. The sliding friction between the slide board 333 and the box body 334 is transformed into rolling friction, reducing the translational resistance of the slide sleeve 335 and enhancing its translational stability. The human-ascending fish mechanism 8 includes the touring passenger cabin 61 and the transport slide 36. The touring passenger cabin 61 is equipped with fish transportation components A 62 on the side near the fish transport box A and fish transportation components B 63 on the side near the fish release slide 4. One end of the transport slide 36 is connected to the lower part of the fish transportation components A 62, and the other end is inclined downward and connected to the lower part of the fish transportation components B 63. The transport slide 36 is inclined, allowing fish from the fish transport box B 34 to slide down to the fish transport box C 35 when gate A 332 is opened. Fish transport components A include fish transport box B 34 and sub-controller A 37. The upper side of the fish transport box B 34 is open, and a slot A 343 corresponding to the transport slide 36 is provided on the bottom.

The fish transportation component A 62 comprises a transport fish box B 34 and a sub-controller A 37. The upper side of the transfer fish box B 34 is open, and a slot A 343 is provided at a position corresponding to the transport slide 36 on the transfer fish box B 34. The vertical slide slot A 344 is machined on the transport fish box B 34 and connected to the slot A 343. The gate B 341 is slidably connected in the vertical sliding groove A344, and the gate B 341 is connected to the top of the transport fish box B 34 through an electric cylinder B 342. The sub-controller A 37 is electrically connected to the electric cylinder B 342 and wirelessly communicates with the central controller 9. During use, the electric cylinder B 342 is installed on the top of the transport fish box B 34, lifting or lowering the gate B 341 through the electric cylinder B 342 to open or close the slot A 343, thereby opening or closing the transport slide 36. The sub-controller A 37 is mounted on the transport fish box B 34, and a wireless receiver A is also installed on the transport fish box B 34, which is electrically connected to the sub-controller A 37. The system further includes a wireless transmitter that is electrically connected to the central controller 9. The central controller 9 transmits instructions to the sub-controller A 37 through the wireless transmitter and the wireless receiver A, and the sub-controller A 37 controls the movement of the electric cylinder B 342 based on the instructions.

The fish transportation component B 63 includes fish transport box C 35 and sub-controller B 38. The upper side of the fish transport box C 35 is open, and a slot B353 is provided at a position corresponding to the transport slide 36 on the fish transport box C35. On the side of the fish transport box C 35 facing away from the touring passenger cabin 61, a discharge outlet 354 is located at the lower part. Furthermore, a vertical sliding groove B 355 is formed on the fish transport box C 35 and connected to the discharge outlet 354. A gate C 351 is slidably connected within the vertical sliding groove B 355, and the gate C 351 is connected to the top of the fish transport box C 35 through an electric cylinder C 352. The sub-controller B 38 is electrically connected to the electric cylinder C 352 and wirelessly communicates with the central controller 9. In operation, the electric cylinder C 352 is installed on the top of the fish transport box C 35, lifting or lowering the gate C 351 to open or close the discharge outlet 354. The sub-controller B 38 is mounted on the fish transport box C 35, and a wireless receiver B is also installed on the fish transport box C 35, which is electrically connected to the sub-controller B 38. The central controller 9 transmits instructions to the sub-controller B 38 through a wireless transmitter and the wireless receiver B, and the sub-controller B 38 controls the movement of the electric cylinder C 352 based on the instructions.

The water supplementation component 5 comprises a water supply tank 53, the height of which is 0.5~1 m larger than the top surface of the fish transfer mechanism 7, the water supply tank 53 is connected with the dam body 1 through the water supply pipe A 51, one end of the water supply pipe A 51 extends into the water body of the dam body 1 reservoir area, and is connected with the electric ball valve A 52, and the middle of the water supply pipe A 51 is arranged in a winding way. The water tank 53 is connected to the fish transfer mechanism 7 through the water refill pipe B 54, and the end of the water refill pipe B 54 near the water refill tank 53 is installed with the electric ball valve B 55, and the electric ball valve A 52 and the electric ball valve B 55 are electrically connected with the central controller 9. In order to avoid the adverse impact of excessive flow velocity on the fish transfer mechanism 7, the water refill component 5 is set as a two-stage water refill mode, that is, the first stage is the combination of winding water refill pipe A 51 and water refill tank 53, and the second stage is the combination of water refill tank 53 and water refill pipe B 54, so as to reduce the large impact force caused by water flow straight down from the height. The water supply tank 53 into which the water supply source enters is located in the downstream position with lower water head, and the height difference between the water supply tank 53 and the water collection horizontal section 31 is small. The water flow can be further controlled through the electric ball valve B 55 to enter the water collection horizontal section 31 according to the appropriate velocity and flow rate. After reaching the water collection horizontal section 31, the water supply water can enter the fishway 2 and the water collection downhill section 32 with lower elevation respectively. Provide them with adequate and suitable water. Part of the water flow enters the transfer fish tank A 33 through the downslope section 32, and the water entering the transfer fish tank A 33 will follow the fish into the transfer fish tank B 34 and C 35, so as to provide sufficient water for the fish during the transfer process, thereby reducing the damage caused to the fish during the transfer and lifting process.

A method of fish-passing system with tourist ornamental function, comprising the following steps in sequence:

A. Fish ascend through the fishway 2 to the water collection horizontal section 31 and then slide down the water collection downward slope section 32 into transport fish tank A 33.

Figure 2:
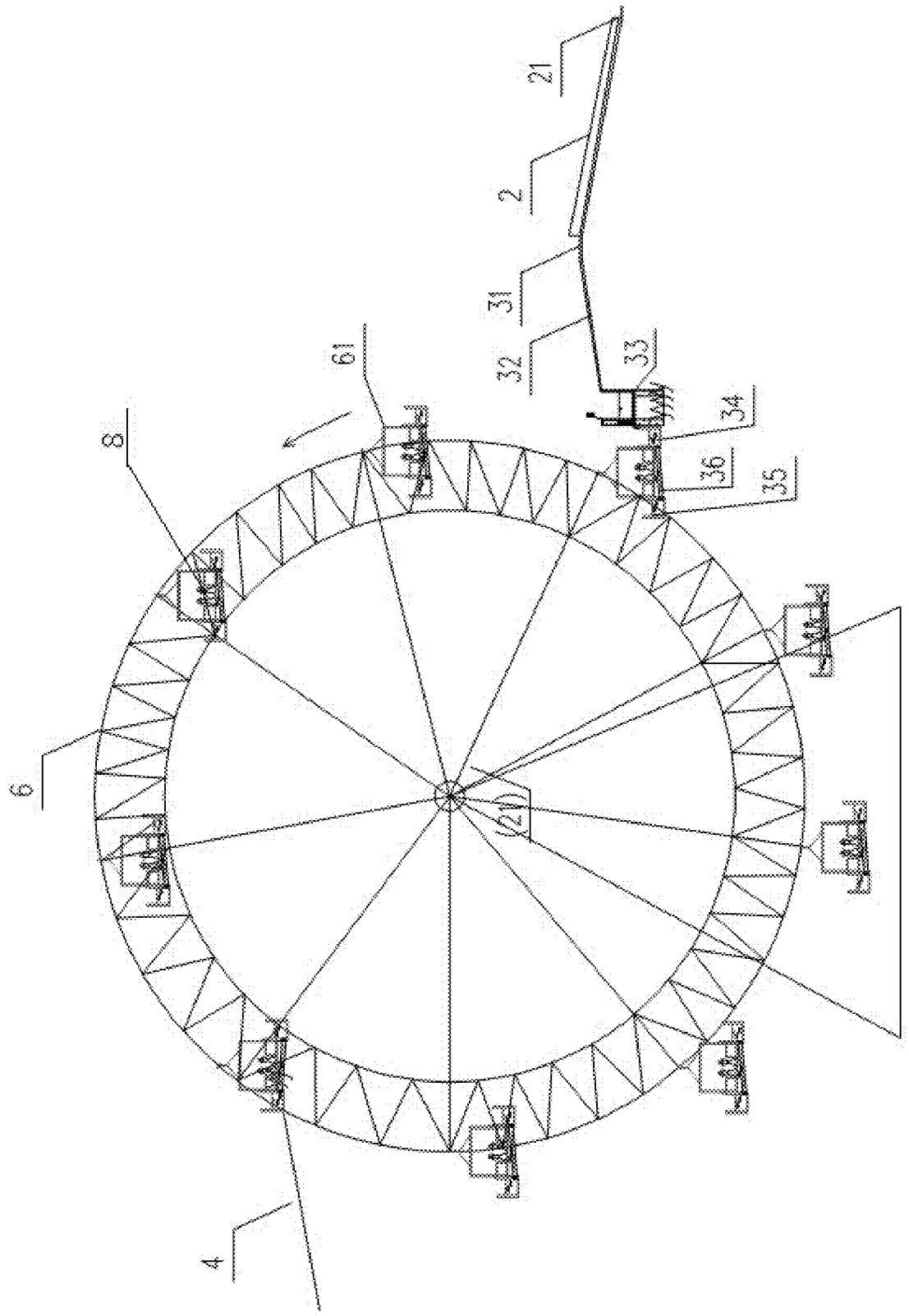
FIG. 2: Schematic diagram of the arrangement structure of the fish release slide, Ferris wheel, and fish transfer mechanism of the present disclosure.
Figure 3:
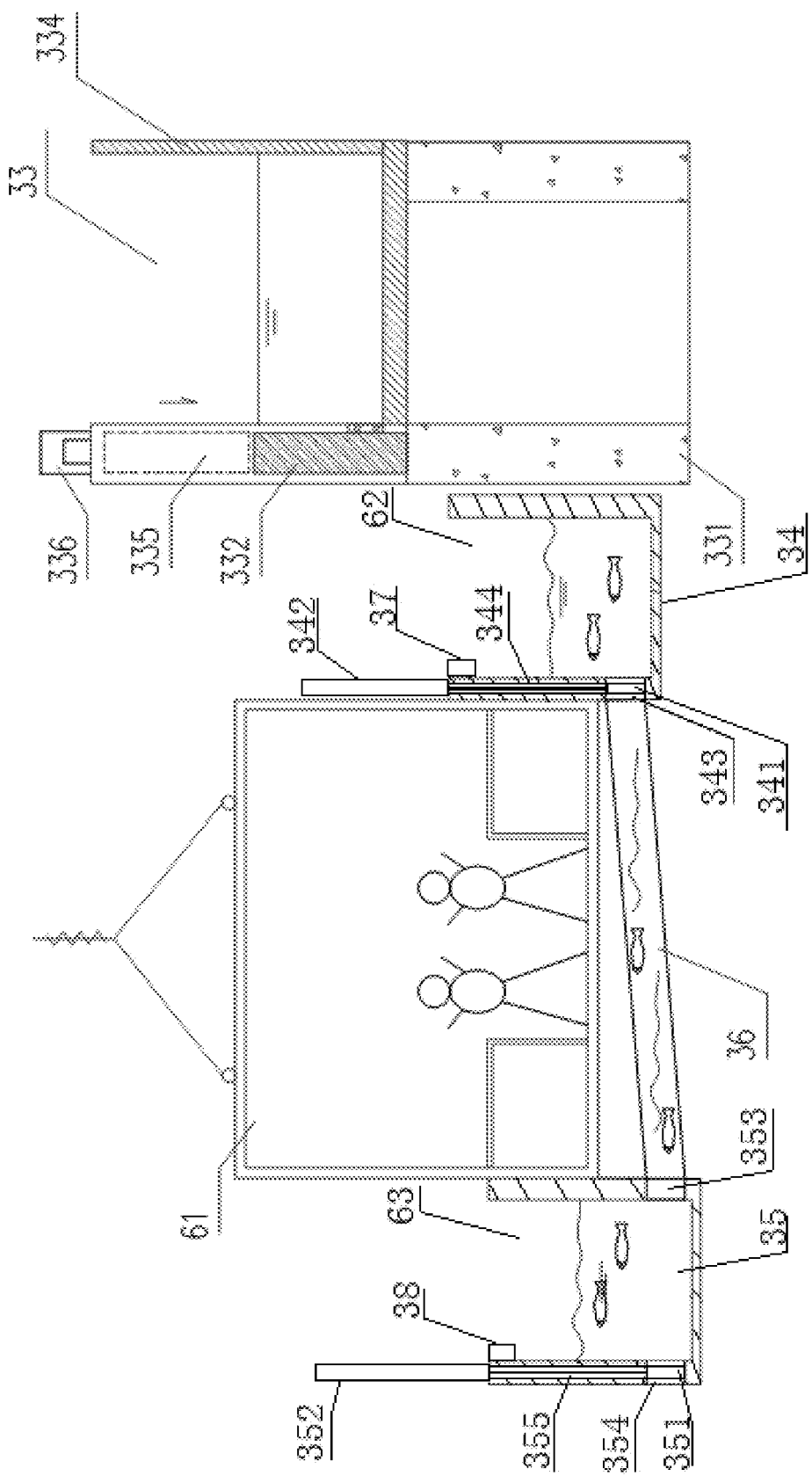
FIG. 3: Structural schematic diagram of the human-carrying fish lifting mechanism of the present disclosure.
Figure 4:
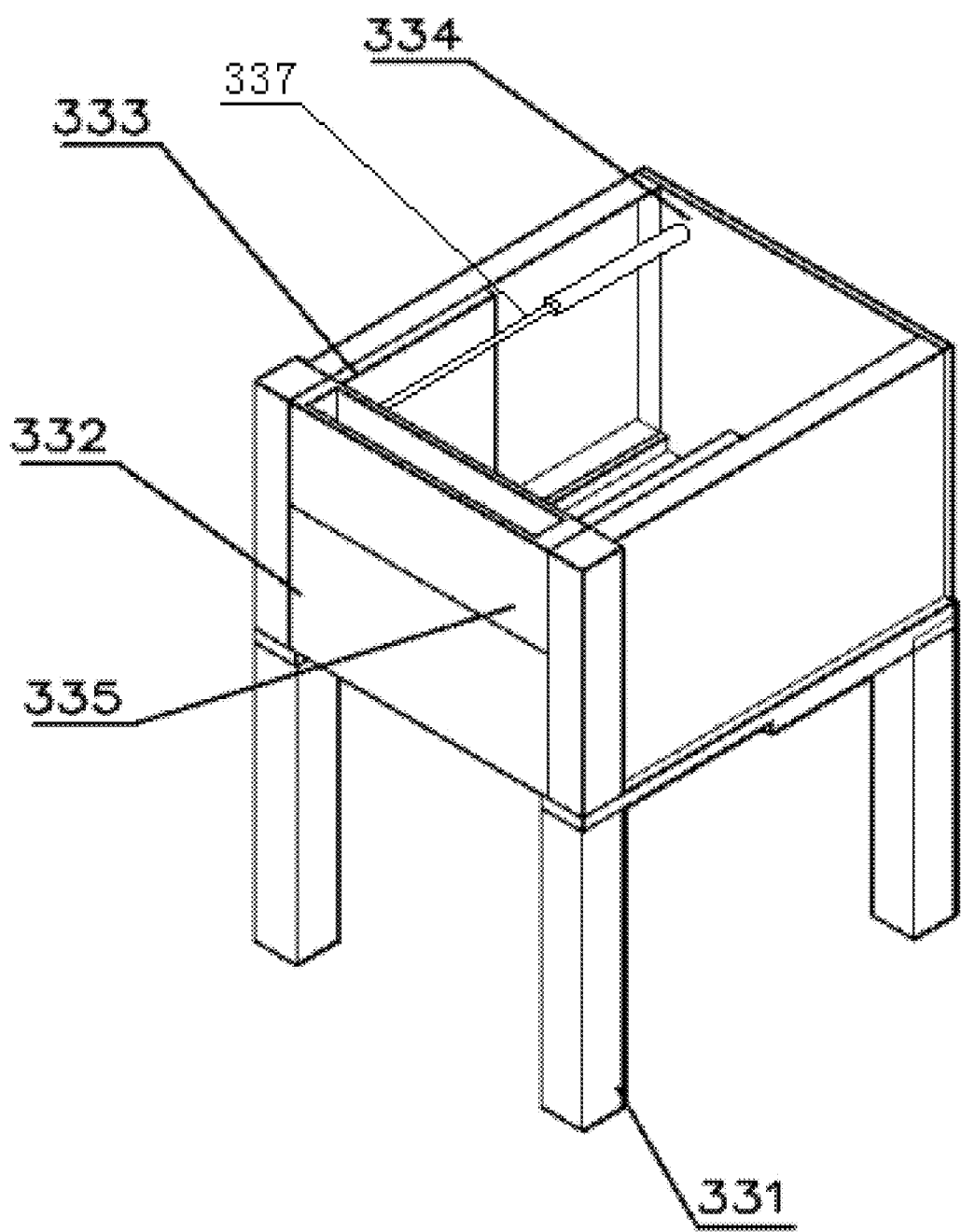
FIG. 4: Structural schematic diagram of fish transport box A after removing electric cylinder A and hydraulic rod.
Figure 5:
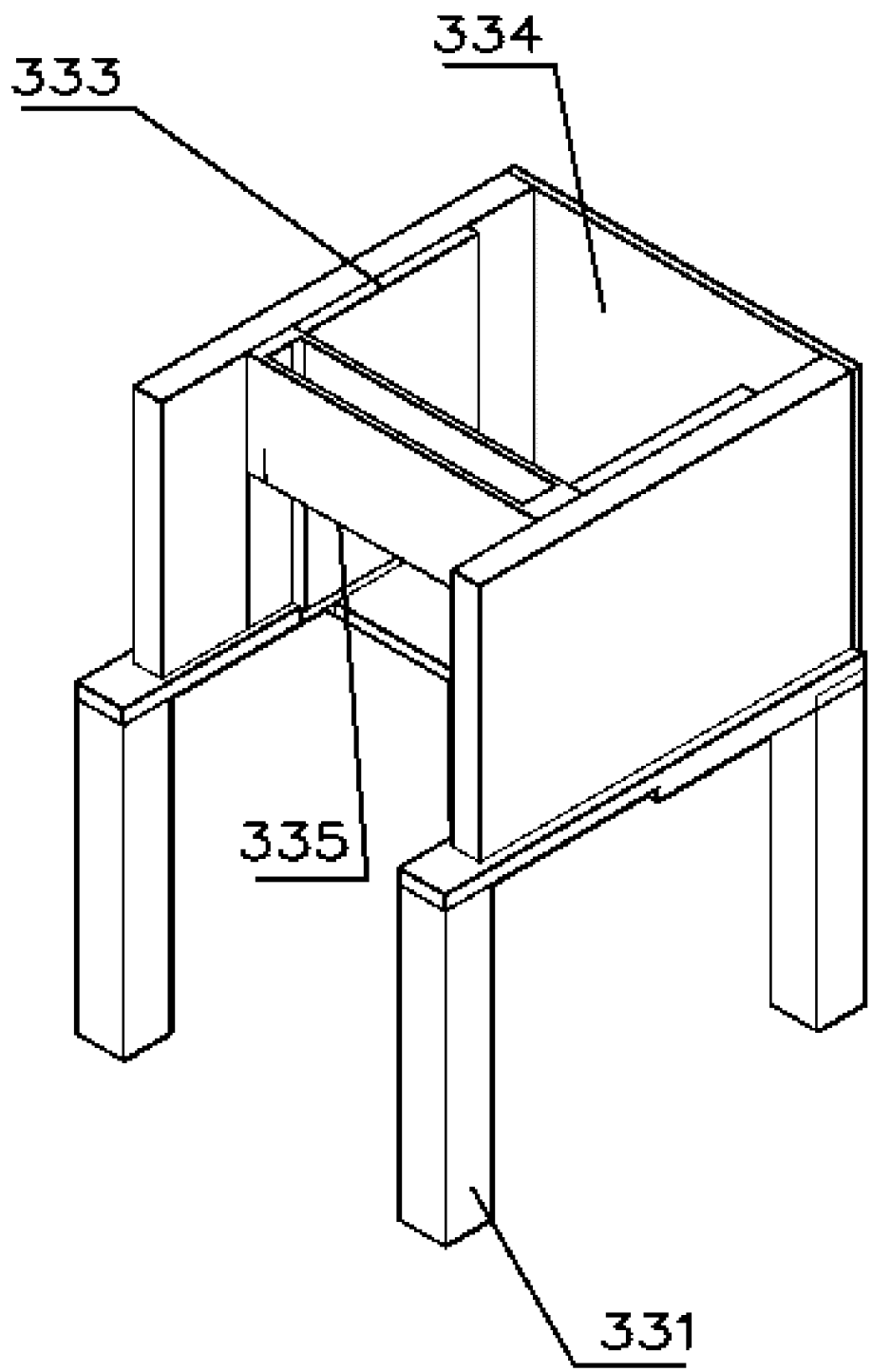
FIG. 5: Structural schematic diagram of fish transport box A with slide sleeve moved to the middle after removing electric cylinder A and hydraulic rod.

B. The Ferris wheel 6 makes intermittent equal motion, when one of the human-ascending fish mechanism 8 is aligned with the transfer fish tank A 33, another human-ascending fish mechanism 8 is aligned with the discharge slipway 4. As shown in FIG. 2, when the human-ascending fish mechanism 8 is aligned with the transfer tank A 33, the transfer tank B 34 in the human-ascending fish mechanism 8 is located at the lower side of the discharge outlet 354 under the slide sleeve 335; When the human-ascending fish mechanism 8 release slide 4 is aligned, the discharge outlet 354 in the human-ascending fish mechanism 8 is located on the upper side of the release slide 4

C. At the instant when the Ferris wheel 6 switches from a rotating state to a paused state, transport fish tank A 33 is activated to release the fish population inside it into the fish transportation component A 62 of human-ascending fish mechanism 8 positioned directly opposite. Simultaneously, the fish transportation component B 63 within the human-ascending fish mechanism 8 aligned with the discharge slide 4 is activated to release the fish population onto the discharge slide 4. Subsequently, the fish population slides down the discharge slide 4 into the water body of the dam reservoir. The action of transferring fish box A 33 in step C refers to the electric cylinder A 336 lifting gate A 332 to open the discharge outlet 354 under the slide sleeve 335; The action of fish transport assembly B in step C refers to the electric cylinder C 352 lifting gate C 351 to open the discharge outlet 354.

D. The Ferris wheel 6 resumes rotation, and prior to the next impending pause, the fish transportation component A 62 that has just received the fish population in step C is activated. This allows the fish population to enter the fish transportation component B 63 within the same human-ascending fish mechanisms 8. Meanwhile, the fish transportation component B 63 that had released the fish population in step C closes the discharge outlet 354. As the Ferris wheel 6 continues to rotate by one-third of the equidistant angle, both the gate A 332 of transport fish tank A 33 and the gate B 341 offish transportation component A 62 close. The action of fish transport assembly A in step D refers to the lifting gate B 341 of electric cylinder B 342 to open the transfer slipway 36; The fish transportation component B 63 closes the release channel of the fish school, which refers to the lower gate C 351 of the electric cylinder C 352 to close the release port; Transfer tank A 33 to close the discharge outlet 354, refers to the electric tank A 336 lower gate A 332 to close the discharge outlet 354 below the slide sleeve 335 for reloading of fish; Fish transportation component A 62 closes the release channel of the fish school, which refers to the electric cylinder B 342 lowering gate B 341 to close the transfer slipway 36.

E. Repeat steps C and D to gradually raise the fish population from the downstream water body of the dam structure (1) to the water body of the dam reservoir. Specifically, Ferris wheel 6 is the prior art, and will not be described.

The working principle of the fish-passing system with tourism and ornamental function is as follows:

The central controller 9 is mechanically connected with the main drive electricity in the Ferris wheel 6 to control the Ferris wheel 6 to do intermittent equal motion. After the fish downstream of dam body 1 migrate upstream through channel 2 to the horizontal section 31 of the water collection, the fish slide to the transfer tank A 33 along the downhill section 32 of the water collection. Meanwhile, part of the water flow supplemented by water replenishment component 5 to the horizontal section 31 of the water collection will flow into the transfer tank A 33 along the downhill section 32 of the water collection to provide sufficient water for the fish in the transfer process. Thus, the damage to fish caused by the transport lifting process can be reduced.

When the Ferris wheel 6 switches from the rotating state to the suspended state, the electric cylinder A 336 lifts the gate A 332 to open a discharge outlet 354 under the slide sleeve 335, and releases the fish in the transfer tank A 33 to the transfer tank B 34 of the fish transfer mechanism 8 opposite it. At the same time, the electric cylinder C 352 in the fish transfer mechanism 8 facing the discharge slide 4 lifts the gate C 351 to open the discharge outlet 354, and releases the fish in the transfer fish box C 35 to the discharge slide 4, and then the fish slide along the discharge slide 4 to the water body of the dam body 1 reservoir area.

The Ferris wheel 6 is rotated again and, before the next pause, the electric cylinder B 342 lift gate B 341, which has just been loaded into the transfer tank B 34 of the school, opens the transfer chute 36 and allows the school to enter the transfer tank C 35 in the same fish transfer mechanism 8 along the transfer chute 36. At the same time, the electric cylinder C 352 in the transfer fish tank C 35, which has just released the fish, lowers the gate C 351 to close the discharge outlet 354. After the Ferris wheel 6 continues to rotate ⅓ of the equal Angle, the electric cylinder A 336 lowers the gate A 332 to close the fish channel under the slide sleeve 335; electric cylinder B 342 lower gate B 341 to close transfer chute 36.

By analogy, in the process of intermittent equipartition movement of Ferris wheel 6, the fish in the downstream water body of dam body 1 will be gradually raised to the water body of dam body 1 reservoir area.

The invention claimed is:

1. A fish-passing system with tourist ornamental function, comprising a dam structure (1), a Ferris wheel (6), a water supplementation component (5), and a central controller (9);
    the dam structure (1) is equipped with an upstream discharge slide (4), with one end of the discharge slide (4) extending into a water body of a dam reservoir;
    a downstream section of the dam structure (1) features a fish transfer mechanism (7) connected to the water body downstream of the dam structure (1) through a fishway (2); the Ferris wheel (6) is positioned between the fish transfer mechanism (7) and the discharge slide (4) and is equipped with a plurality of fish-carrying and human-ascending fish mechanisms (8);
    one end of the water supplementation component (5) extends into the water body of the dam structure (1), and the other end is connected to the fish transfer mechanism (7);
    the central controller (9) is connected to the Ferris wheel (6), the fish transfer mechanism (7), and the plurality of fish-carrying and human-ascending fish mechanisms (8);
    the fish transfer mechanism (7) includes a water collection downward slope section (32) and a transport fish tank A (33);
    one end of the water collection downward slope section (32) is connected to the fishway (2) through a water collection horizontal section (31), and the other end is inclined downward; the transport fish tank A (33) is located at an end of the water collection downward slope section (32), away from the fishway (2), and the transport fish tank A (33) is lower than the water collection downward slope section (32); the plurality of fish-carrying and human-ascending fish mechanisms (8) comprise a touring passenger cabin (61) and a transfer chute (36);
    the touring passenger cabin (61) has fish transportation components A (62) on a side near a fish transfer mechanism (7) and fish transportation components B (63) on a side near the discharge slide (4);
    one end of the transfer chute (36) is connected to a lower part of the fish transportation components A (62), while another end of the transfer chute (36) is inclined downward and connected to a lower part of the fish transportation components B (63); and
    the transport fish tank A (33) comprises a box body (334), a sliding sleeve (335), and gate A (332);
    a bottom of the box body (334) is equipped with multiple parallel support legs (331); an upper side of the box body (334) opens on a side away from the water collection downward slope section (32);
    the sliding sleeve (335) is located on an upper inner side of the box body (334), and two ends of the sliding sleeve (335) slide on an inner wall of the box body (334) through sliding plates (333);
    the sliding sleeve (335) is connected to the box body (334) through multiple parallel hydraulic rods (337), and the gate A (332) is positioned on an inner side of the sliding sleeve (335); and
    the gate A (332) is connected to a top of the sliding sleeve (335) through actuator A (336), which is electrically connected to the central controller (9).

2. The fish-passing system with tourist ornamental function as claimed in claim 1, wherein the fishway (2) is designed as a vertical slot fishway, and one end of the fishway (2) near the fish transfer mechanism (7) is inclined upward.

3. The fish-passing system with tourist ornamental function as claimed in claim 1, wherein fish transportation components A (62) comprises a transport fish tank B (34) and a sub-controller A (37);
    an upper side of the transport fish tank B (34) features an opening, and a slot A (343) is established on the transport fish tank B (34) at a position corresponding to the transfer chute (36);
    vertical sliding grooves A are machined on the transport fish tank B (34), connecting to the slot A (343), and gate B (341) slides within a vertical groove A;
    gate B (341) is connected to a top of the transport fish tank B (34) through electric cylinder B (342); and
    the sub-controller A (37) is electrically connected to the electric cylinder B (342) and wirelessly connected to the central controller (9).

4. The fish-passing system with tourist ornamental function as claimed in claim 1, wherein the fish transportation components B (63) comprises a transport fish tank C (35) and a sub-controller B (38);
    an upper side of the transport fish tank C (35) features an opening, and a slot B (353) is established on the transport fish tank C (35) at a position corresponding to the transfer chute (36);
    at a lower part of a side of the transport fish tank C (35) opposite the touring passenger cabin (61), a discharged outlet (354) is established, and a vertical sliding groove B is established on the transport fish tank C (35), connecting to the discharged outlet (354);
    gate C (351) slides within the vertical groove B and is connected to a top of the transport fish tank C (35) through electric cylinder C (352); and
    the sub-controller B (38) is electrically connected to the electric cylinder C (352) and wirelessly connected to the central controller (9).

5. The fish-passing system with tourist ornamental function as claimed in claim 1, wherein the water supplementation component (5) comprises a water supply tank (53);

the water supply tank (53) is positioned at a height 0.5 m~1 m above a top surface of the fish transfer mechanism (7);

the water supply tank (53) is connected to the dam structure (1) through a water supply pipe A (51), with one end extending into the water body of the dam structure (1) and connected to an electric ball valve A (52);

the water supply pipe A (51) is arranged in a winding manner, and the water supply tank (53) is connected to the fish transfer mechanism (7) through a water supply pipe B (54);

the electric ball valve A (52) and an electric ball valve B are both electrically connected to the central controller (9).

6. A method of fish-passing system with tourist ornamental function as claimed in claim 1, wherein, comprising the following steps in sequence:

A. fish ascending through a fishway (2) to a water collection horizontal section (31) and then sliding down a water collection downward slope section (32) into the transport fish tank A (33);

B. performing intermittent equidistant rotational movement by a Ferris wheel (6);

when one of a plurality of fish-carrying and human-ascending fish mechanisms (8) aligns with the transport fish tank A (33), another one of the plurality of fish-carrying and human-ascending fish mechanisms (8) aligns with a discharge slide (4);

C. activating the transport fish tank A (33) to release a fish population inside the transport fish tank A (33) into a fish transportation component A of the plurality of fish-carrying and human-ascending fish mechanisms (8) at the instant when the Ferris wheel (6) switches from a rotating state to a paused state;

simultaneously, activating a fish transportation component B within the another one of the plurality of the fish-carrying and human-ascending mechanism (8) aligned with the discharge slide (4) to release the fish population onto the discharge slide (4);

subsequently, the fish population sliding down the discharge slide (4) into a water body of a dam reservoir;

D. resuming rotation of the Ferris wheel (6), and prior to the next impending pause, activating the fish transportation component A that has just received the fish population in step C;

meanwhile, closing a discharged outlet (354) by the fish transportation component B that had released the fish population in step C;

as the Ferris wheel (6) continues to rotate by one-third of an equidistant angle, closing the discharged outlet (354) by both the transport fish tank A (33) and the fish transportation component A; and E. repeating steps C and D to gradually raise the fish population from a downstream water body of a dam structure (1) to the water body of the dam reservoir.

7. The method of fish-passing system with tourist ornamental function as claimed in claim 6, wherein, the fishway (2) is designed as a vertical slot fishway, and one end of the fishway (2) near a fish transfer mechanism (7) is inclined upward.

8. The method of fish-passing system with tourist ornamental function as claimed in claim 6, wherein the transport fish tank A (33) comprises a box body (334), a sliding sleeve (335), and gate A (332);

a bottom of the box body (334) is equipped with multiple parallel support legs (331); an upper side of the box body (334) opens on a side away from the water collection downward slope section (32);

the sliding sleeve (335) is located on an upper inner side of the box body (334), and the sliding sleeve (335) has two ends and the two ends slide on a inner wall of the box body (334) through sliding plates (333);

the sliding sleeve (335) is connected to the box body (334) through multiple parallel hydraulic rods (337), and the gate A (332) is positioned on an inner side of the sliding sleeve (335); and the gate A (332) is connected to a top of the sliding sleeve (335) through actuator A (336), which is electrically connected to a central controller (9).

9. The method of fish-passing system with tourist ornamental function as claimed in claim 6, wherein the fish transportation component A comprises a transport fish tank B (34) and a sub-controller A;

an upper side of the transport fish tank B (34) features an opening, and a slot A (343) is established on the transport fish tank B (34) at a position corresponding to a transfer chute (36);

vertical sliding grooves A are machined on the transport fish tank B (34), connecting to the slot A (343), and gate B (341) slides within a vertical groove A;

the gate B (341) is connected to a top of the transport fish tank B (34) through electric cylinder B (342); and the sub-controller A (37) is electrically connected to the electric cylinder B (342) and wirelessly connected to a central controller (9).

10. The method of fish-passing system with tourist ornamental function as claimed in claim 6, wherein the fish transportation component B comprises a transport fish tank C (35) and a sub-controller B (38);

an upper side of the transport fish tank C (35) features an opening, and a slot B (353) is established on the transport fish tank C (35) at a position corresponding to a transfer chute (36);

at a lower part of the side of the transport fish tank C (35) opposite a touring passenger cabin (61), a discharged outlet (354) is established, and a vertical sliding groove B is established on the transport fish tank C (35), connecting to the discharged outlet (354);

gate C (351) slides within the vertical groove B and is connected to a top of the transport fish tank C (35) through electric cylinder C (352); and the sub-controller B (38) is electrically connected to electric cylinder C (352) and wirelessly connected to a central controller (9).

11. The method of fish-passing system with tourist ornamental function as claimed in claim 6, wherein a water supplementation component (5) comprises a water supply tank (53);

the water supply tank (53) is positioned at a height 0.5 m~1 m above a top surface of the fish transfer mechanism (7);

the water supply tank (53) is connected to the dam structure (1) through a water supply pipe A (51), with one end extending into the water body of the dam structure (1) and connected to an electric ball valve A (52);

the water supply pipe A (51) is arranged in a winding manner, and the water supply tank (53) is connected to the fish transfer mechanism (7) through a water supply pipe B (54); and the electric ball valve A (52) and an electric ball valve B are both electrically connected to a central controller (9).

\* \* \* \* \*